Aug. 21, 1928.
R. P. FOX
1,681,848
DIRIGIBLE AIRSHIP
Filed March 6, 1926     8 Sheets-Sheet 1
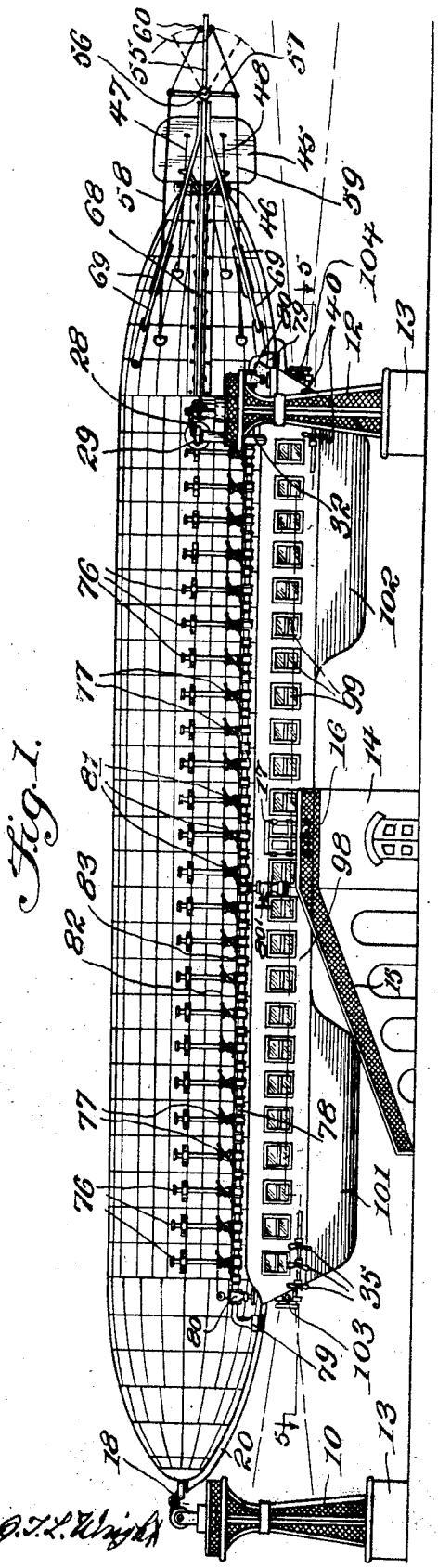
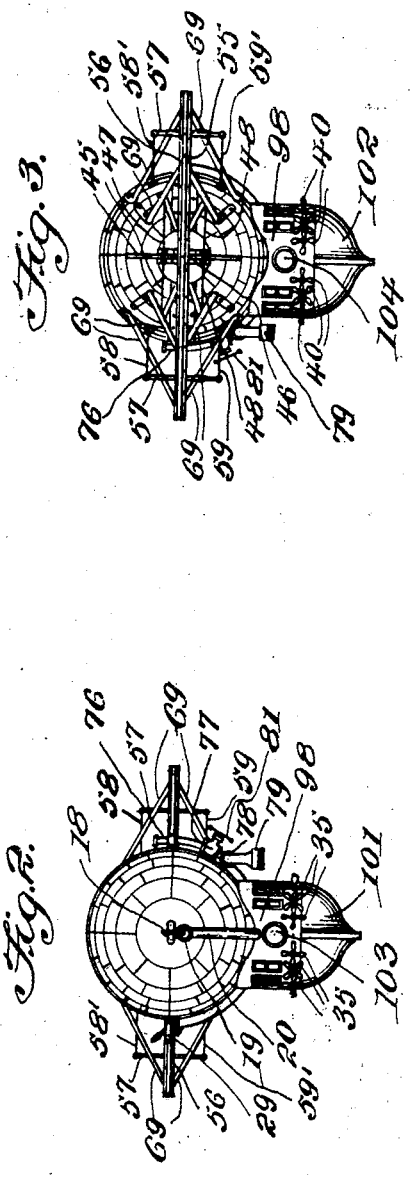
Ralph P. Fox
INVENTOR
BY Victor J. Evans
ATTORNEY
WITNESS:

Aug. 21, 1928.  
R. P. FOX  
1,681,848  
DIRIGIBLE AIRSHIP  
Filed March 6, 1926  
8 Sheets-Sheet 2
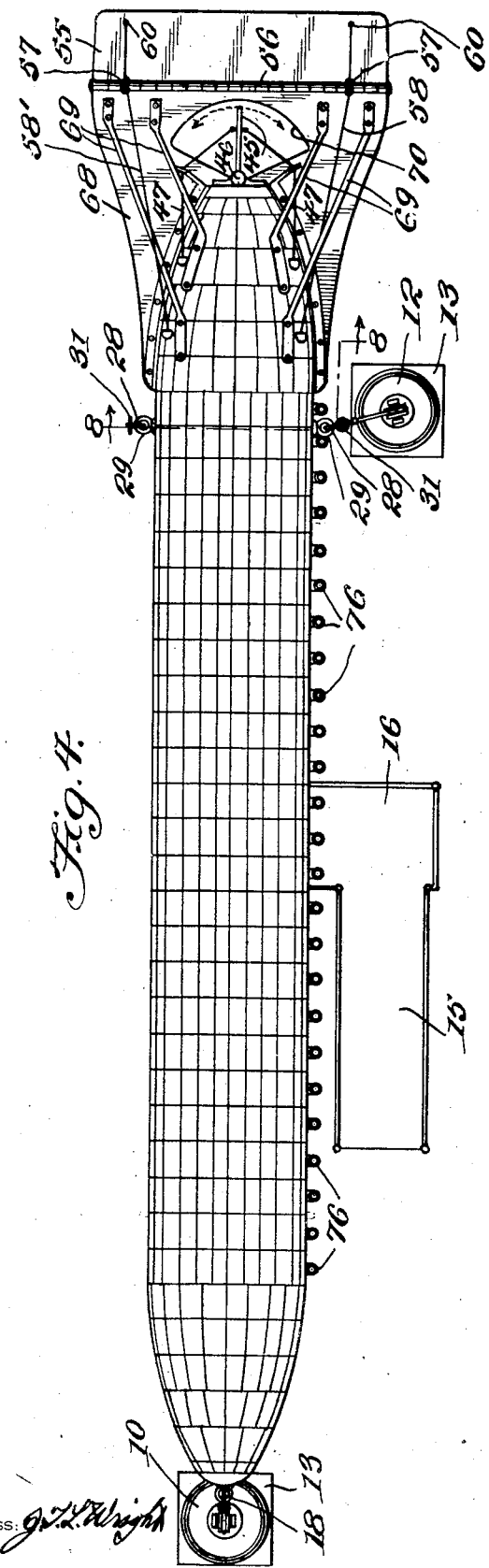
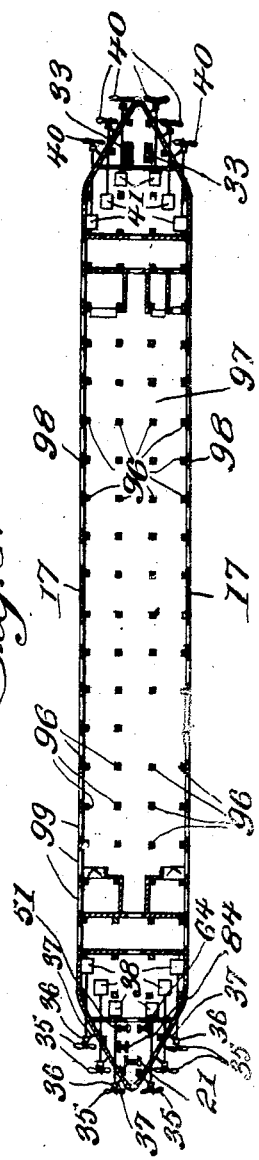
Ralph P. Fox, INVENTOR
BY Victor J. Evans, ATTORNEY
WITNESS: J. L. Wright

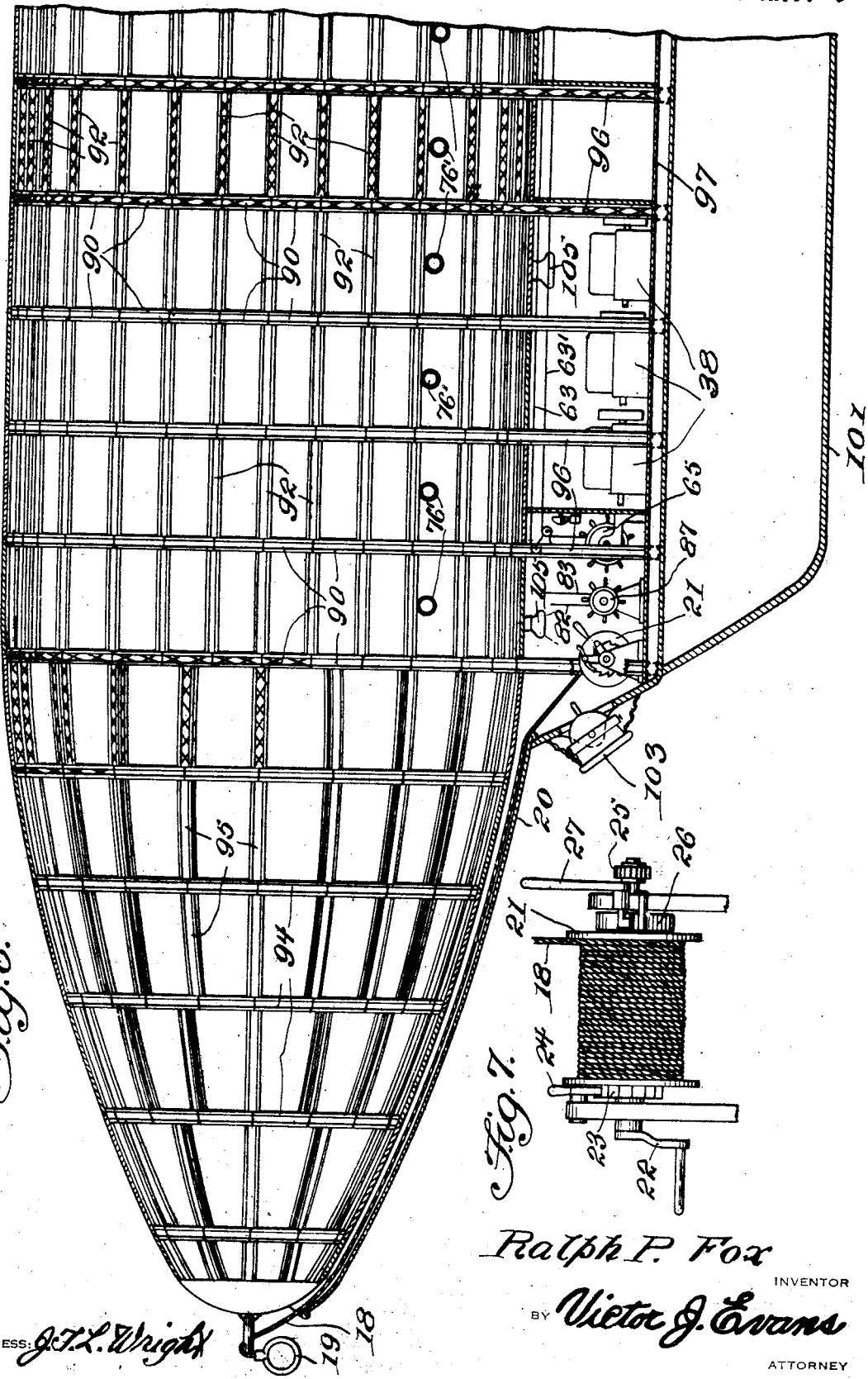

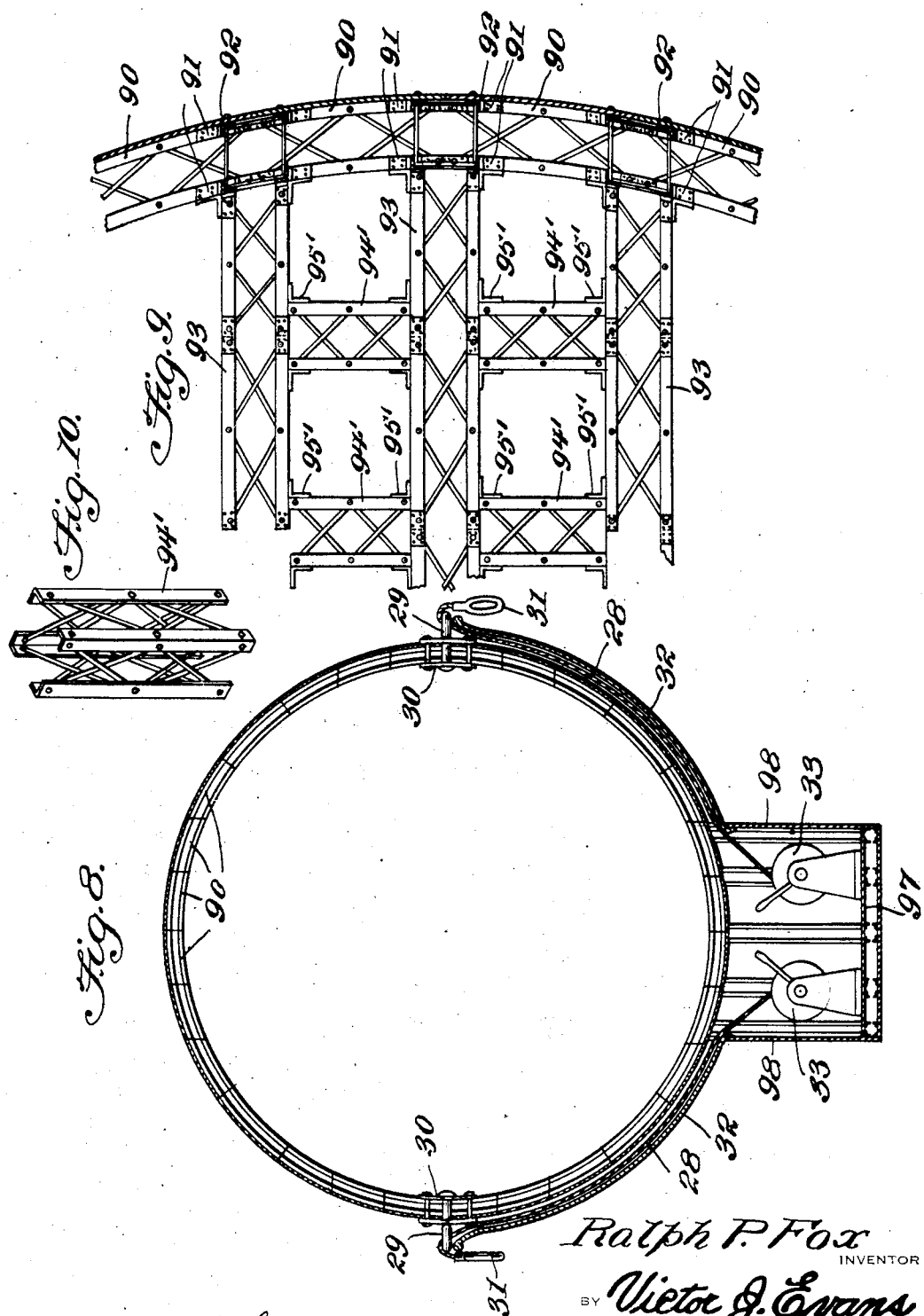

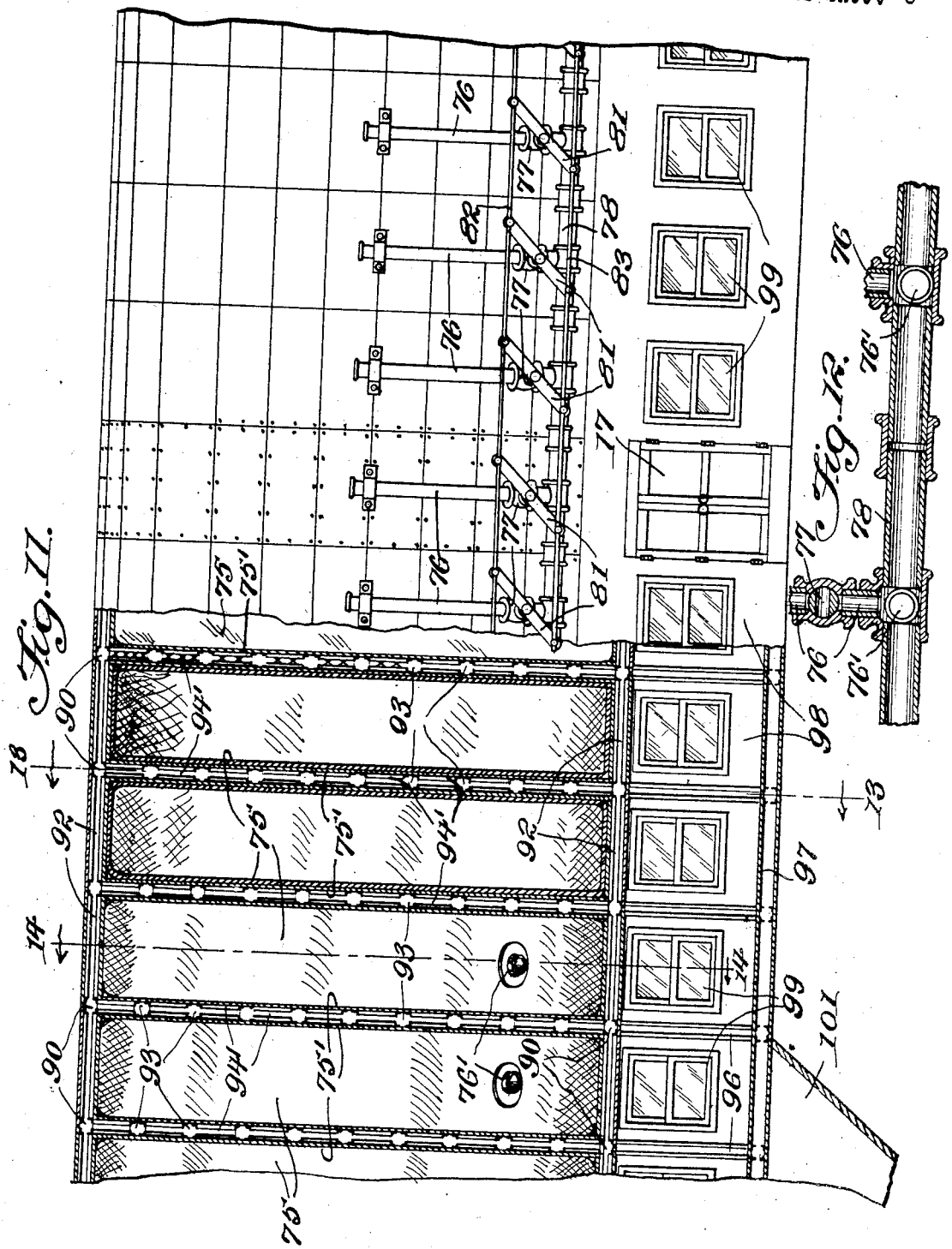

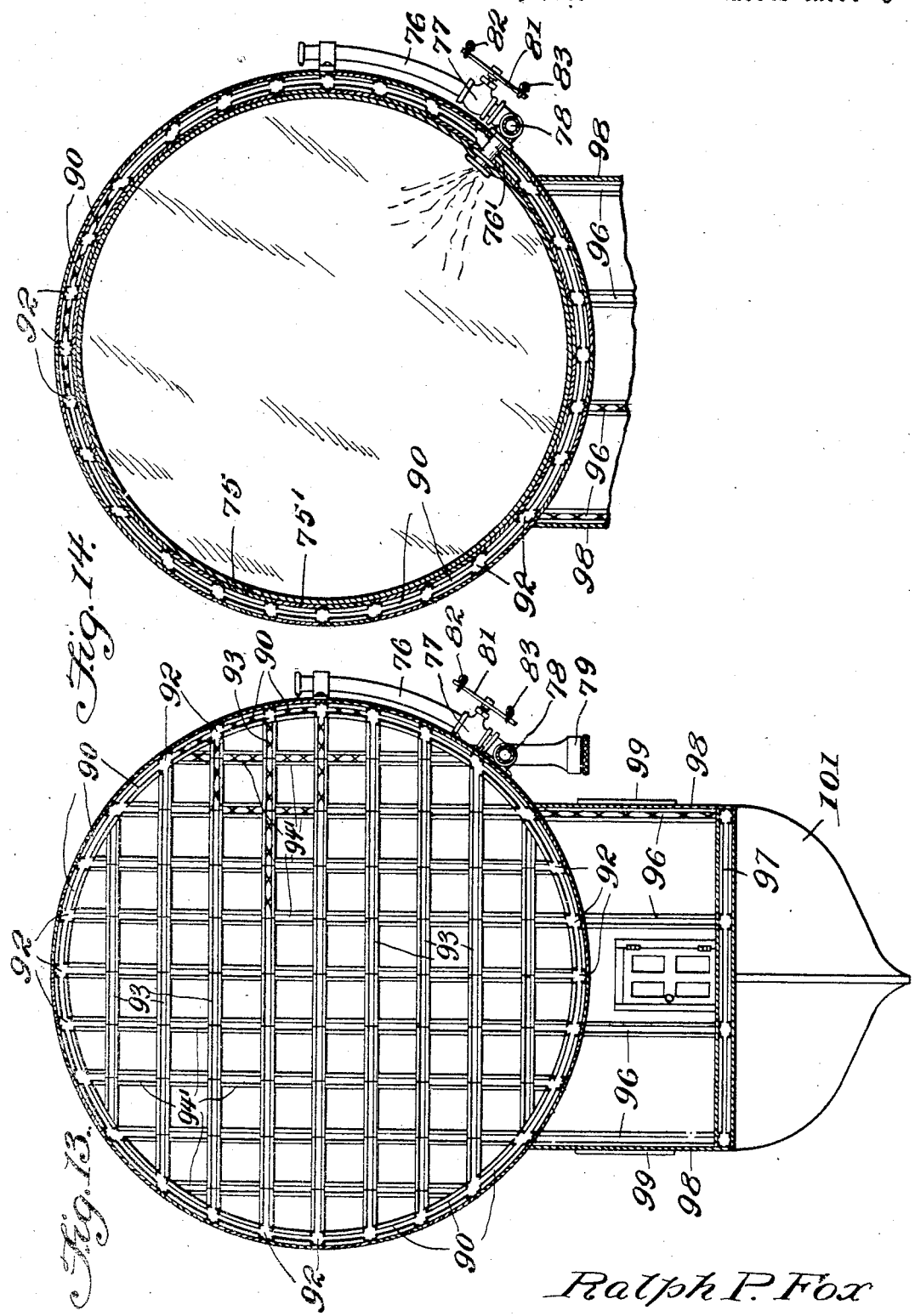

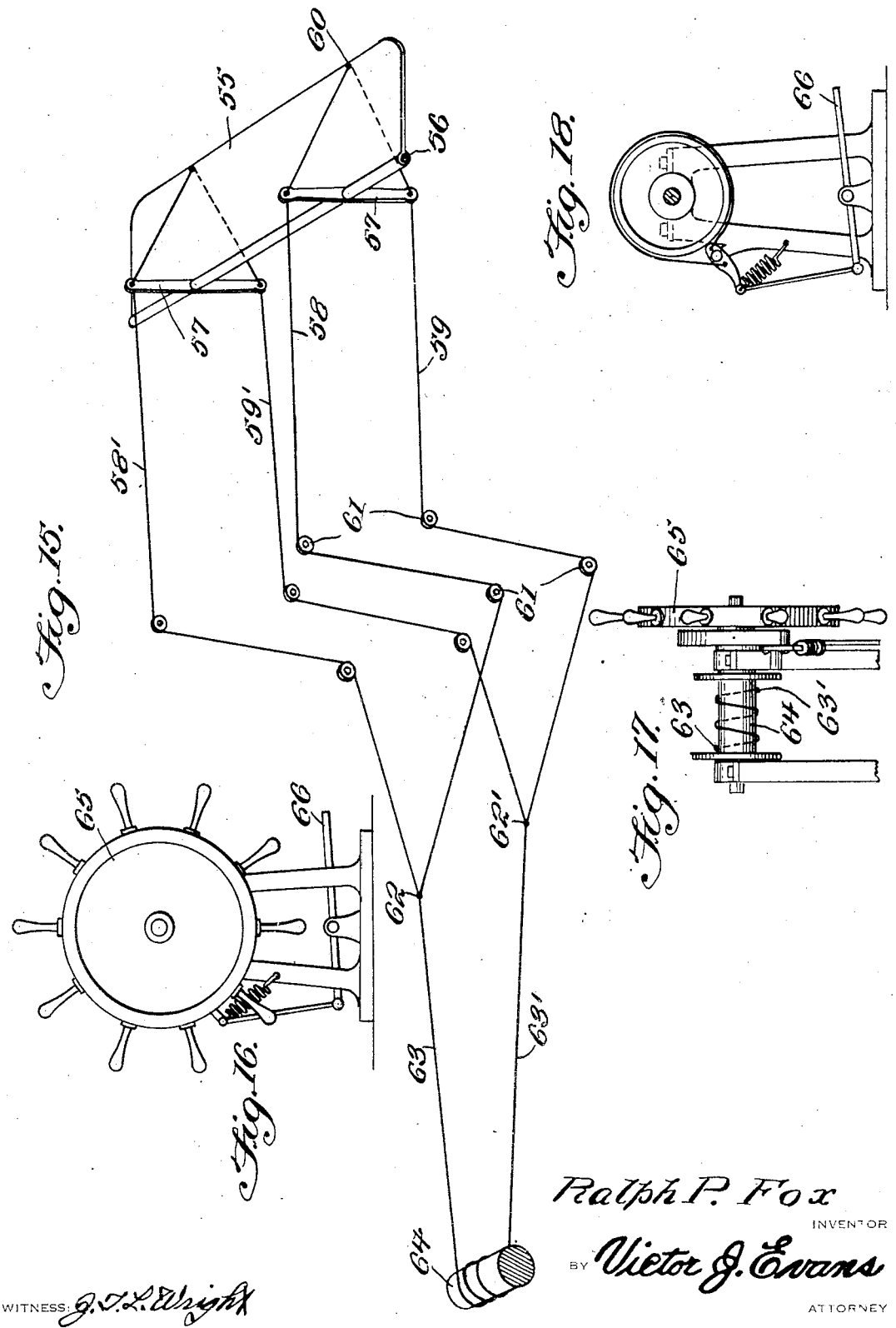

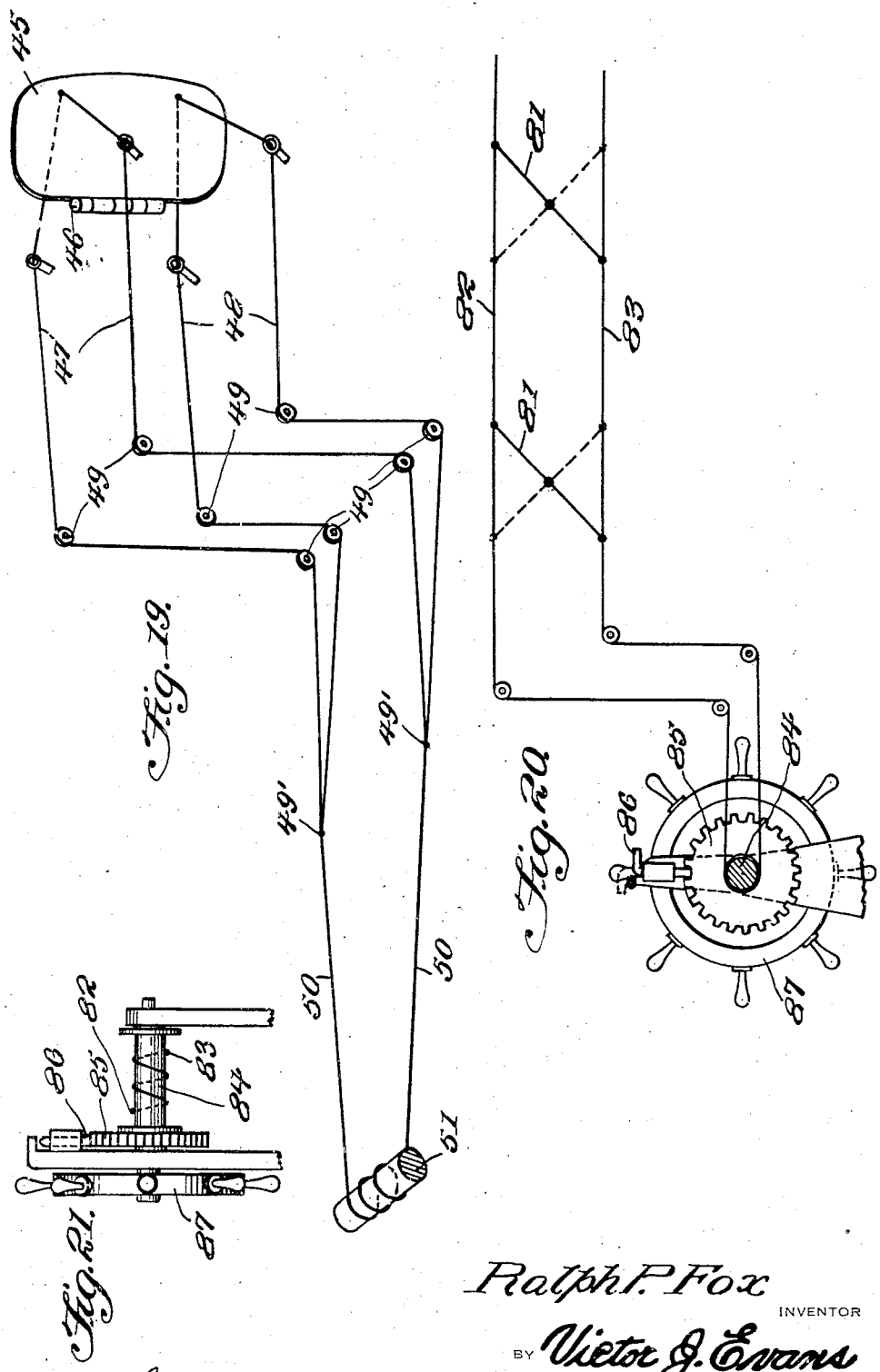

Patented Aug. 21, 1928.

1,681,848

UNITED STATES PATENT OFFICE.

RALPH P. FOX, OF HARRISBURG, PENNSYLVANIA.

DIRIGIBLE AIRSHIP.

Application filed March 6, 1926. Serial No. 92,827.

The object of this invention is to provide an all-metal air craft of the dirigible type, in which many improvements over usual construction shall be embodied, special provision also being made for lightness and rigidity, by employing a suitable metal or alloy, such as duraluminum wherever necessary, or throughout the ship.

A further object is to provide for the special grouping of cells or gas containers, with particular means for inflating the cells and controlling the valves thereof.

A further object is to provide for the mounting of forward and rear propellers, with a separate engine for each propeller, the propellers being of the four-blade type, and being specially mounted with reference to each other and to the main structure.

A further object is to provide a main frame built up of units or sections, each having special form and constructed to resist strains in a maximum degree.

A further object is to provide a keel structure to be built into the main structure, and adapted to house the units and compartments idicated below, and to support forward and ear pontoons.

A further object is to provide for mooring the airship to a mast by means of devices connected with the head or bow, and further to provide for mooring the machine to another mast at a point near the stern, but forwardly of the rudders, and their controlling means, and without interfering with or endangering the rear propellers.

A further object is to provide for the special control of the rudders.

A further object is to make special provision for receiving and discharging passengers.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view of the airship in side elevation, front and rear mooring masts also being shown, together with an intermediate stationary structure for loading and unloading passengers, or material being shipped.

Figure 2 is a view in front elevation.

Figure 3 is a view in rear elevation.

Figure 4 is a view in top plan.

Figure 5 is a horizontal section, longitudinally of the structure, the view being on line 5—5 of Figure 1, looking downwardly.

Figure 6 shows the forward portion of the frame-work, the structural details of certain of the sections being illustrated, together with a portion of the controlling mechanism.

Figure 7 is a detail in elevation, showing one of the cable winding devices.

Figure 8 is a section on line 8—8 of Figure 4 showing means for effecting connection with the rear mooring mast.

Figure 9 is a fragmentary view in elevation, showing the arrangement of the girders in the main transverse sections of the frame.

Figure 10 is a perspective view showing one of the trussed members of Figure 9.

Figure 11 is a view partly in elevation and partly in longitudinal section showing that portion of the structure in which the gas cells or containers are mounted.

Figure 12 is a longitudinal section through a portion of the main duct through which gas is conveyed to the individual gas cells, one of the valve controlled blow-off pipes being illustrated.

Figure 13 is a vertical transverse section on line 13—13 of Figure 11.

Figure 14 is a vertical transverse section on line 14—14 of Figure 11.

Figure 15 is a diagrammatic view showing the control of the horizontal rudder, that is the rudder controlling elevation.

Figures 16, 17 and 18 are views in elevation showing cable winding means and brake mechanism, described below.

Figure 19 is a diagrammatic view showing the means for controlling the vertically mounted rudder, by which the course is determined at any given elevation of the ship.

Figure 20 is a view showing in elevation means for controlling the cables for the valves 77.

Figure 21 is an elevation of the winding means per se of Figure 20.

In Figure 1 the dirigible is shown as being secured to mooring masts 10 and 12, these structures being of any suitable type and mounted upon bases such as 13. Intermediate of the masts is a structure including a central portion 14, with an approach 15, by means of which access is obtained to platform 16 from which passengers may pass into the vessel through the doorway shown at 17. Connection is made with mast 10 by means of a cable 18, see Figure 6, carrying any suitable element 19 for the purpose indicated, this cable extending through the space or channel 20 beneath the nose portion of the structure, and thence extending to a winding device, such as that shown in Figures 6 and 7, and including a drum 21, a crank connection 22, and pawl and ratchet mechanism including the wheel 23 and dog 24. This device may be operated by power through wheel 25, and clutch mechanism 26 permits of control in an obvious manner, through lever 27.

In Figures 4 and 8, I have shown special means for effecting connection with the mast 12, these means including a steel cable 28 on each side of the main structure, these cables 28 passing through eye bolts 29, secured in the frame work as indicated at 30, and the cables carrying on their outer ends rings, such as 31 by means of which connection is made with the mast. Each cable 28 passes through a guard member, or between the latter and the main structure, this element or guard being designated 32. Winding devices, such as drums 33, are provided for the cables 28, and power may be applied to the drums in any suitable manner, so that after the craft has been secured to the forward mast, connection may be made at either side of the structure, to mast 12, the approach through or over platform 16 of the structure 14, then becoming practicable.

The power mechanism includes six tractor propellers, mounted three on each side of the forward portion of the vessel. These propellers are designated 35, and are mounted in bearings 36 supported by the laterally extending brackets 37, the shafts being driven individually from the engines 38. The shafts of the propellers 35, on each side of the nose portion, are in the same horizontal plane, but longitudinally of the machine, they are in parallel relation, or rather the axes of rotation are parallel.

Towards the stern of the vessel, propellers 40 are mounted in a similar manner, and are driven individually by engines 41. It will be observed that there is a balanced drive when all of the propellers are in operation, and this balance may be maintained when only four propellers, two at each end of the craft, are in operation. On the other hand, the propellers may be so controlled, that they will aid or govern the steering operation.

The vertical rudder 45 is movable about axis or axial element 46 and is controlled by cables 47 and 48, on each side, these cables passing over pulleys 49, any suitable number being provided, and the two cables on each side being connected with each other at the point 49', whence the connection is by a single cable 50 on each side to winding device 51, it being understood that the cables 50 may have connection with each other at an intermediate point, or may constitute a continuous cable, so that the winding device or drum 51, when rotated, will exert tension on one cable 50 while the other is relaxed, for moving the blade 45 in a manner well understood.

Elevator or blade 55 and its controlling means are shown in Figure 15.

The blade 55 movable about an axis perpendicular to the axis of blade 45, includes an axial member 56, with which arms 57 are connected. Cables 58 and 59 extend to the ends of arms 57, and are thence carried to the blade 55 near its outer or rear edge, being secured at the point 60. These cables 58 and 59 pass over pulleys such as 61, a suitable number being provided, and cable 58 extends to a point 62 where it has connection with cable 63, connected with the blade 55 in the manner shown. Cable 63 passes over roller or drum 64, and merges into cable 63' connected at 62' with cable 59 and with cable 59' having connection with blade 55 in the manner shown. This arrangement makes it possible to control or move rudder or blade 55 in either direction by means of the rotation of drum 64 in the required direction, as will be readily understood. The controlling means are shown in Figures 16, 17 and 18, and include the wheel 65 and the foot operated mechanism controlled by pedal 66, providing retarding or retaining means.

The tail member directly mounting the rudder is designated 68, and is supported by braces such as 69, any suitable number of the elements last named being provided. This tail portion 68 provides also an opening 70 through which the other rudder or blade extends and in which it operates.

The outer shell or sheathing incloses the main framework and is of metal of the kind previously indicated, and gas cells 75, say twenty-five in number, are inclosed within the shell and within cell containers 75'. These elements are between the transverse frame sections or units of Figure 13, being surrounded by the longitudinal girders of Figures 6 and 14. The cell containers, formed of the same metal or alloy, each permit of the connection of the cells with a main pipe, the branch pipes 76 are each controlled by a valve 77, and these outlet pipes 76 communicate with ports 76' of the main pipe 78 having filling connections 79 at opposite ends, and controlled by valve 80. A second filling connection is controlled by valve 80'.

The stems of the valves 77 are controlled by arms 81 and wires or cables 82 and 83, merging into each other and carried around drum 84. This drum mounts a toothed wheel 85 with which retaining device or dogs 86 cooperate. A hand wheel 87 provides for the rotation of the drum, and the simultaneous control of the valves 77.

Figure 12 shows the position of valves 77 with reference to main pipe 78, and the arrangement is further shown in Figure 11 wherein the arms connected with the stems of valves 77 appear in elevation. Each gas cell discharges thru port 76', valve 77 and pipe 76.

The units of the frames between the gas containers, and constituting the transverse units of the main frame are shown in Figures 9 and 11, and elsewhere, and include the outer segmental units 90 built up of trussed structural members, as shown, connected by brackets 91 with longitudinal girders 92 and with transverse girders 93. Trussed columns 94' are secured by angle brackets 95', between the transverse girders 93. The structure thus provided is exceptionally strong, and the bracing is uniform throughout the main portion of the vessel, the transverse units of Figure 13, between the gas containers affording protection for the individual cells, and constituting a part of the complete structural plan.

The structure at the nose portion includes the transverse frames 94, and the longitudinal girders 95, spaced as indicated in Figure 6, and the structure at the stern is of a similar character.

The keel is framed into the main framework, and in Figures 13 and 14, it will be observed that several vertical trussed girders 96 depend from the main frame, and form elements of the lower structure housing the operative mechanism, exclusive of the propellers and rudders and housing the officers' and passengers' accommodations. The frames of the propellers, or the brackets mounting the bearings thereof are carried by the lower structure here referred to. The floor 97 and the walls 98 appear in section and in elevation, respectively in Figure 11, and windows 99 are provided along the side. Besides the officers' and passengers' quarters, there will be a baggage room, a front engine room, a rear engine room, provision for an electric lighting system and for wireless apparatus, and likewise all conveniences desirable under similar circumstances. Below the keel, pontoons such as 101 and 102, are rigidly suspended or mounted. A headlight is designated 103, a light at the stern is shown at 104, and other lights may be provided as required, some of these lights being shown at 105 in Figure 6.

Having thus described the invention, what is claimed is:

1. In a device of the class described, a plurality of spaced circular transverse units each including outer segmental structural elements, transverse girders extending across said units, brackets connected with the transverse girders, and connected with the segmental elements, columns extending between the transverse girders, and longitudinal girders connected by the brackets with the transverse girders.

2. In a device of the class described, a main structure comprising a nose frame and a stern frame, tapered towards their outer ends and including a plurality of circular transverse units spaced apart, and each comprising segmental structural elements, means for bracing said elements transversely thereof, said means including trussed transverse girders and trussed supports extending vertically and alternating in pairs with the transverse girders, and means for rigidly connecting said units in a direction longitudinally of the main structure.

3. In a device of the class described, a main structure comprising a nose frame and a stern frame, tapered towards their outer ends and including a plurality of circular transverse units each comprising segmental structural elements and transverse braces, longitudinal elements for bracing said units and spacing them apart, brackets connected with the longitudinal elements and transverse braces and with the segmental elements, a keel section, and means connected with the transverse units for framing the keel structure into said main structure.

4. In a device of the class described, a main structure comprising transverse units of circular cross section and each including outer segmental elements and inner transverse and vertical frame members, structural members depending from the transverse units, and a keel section built upon said depending members, and single elements distributing longitudinal, vertical, and transverse strains through the points of connection between the segmental elements and transverse frame members.

5. In a device of the class described, a main frame, a tail portion extending rearwardly and laterally therefrom and provided with an opening therethrough adjacent to the end of the frame, a blade pivotally mounted at the end of the tail portion, and a blade mounted at the stern and movable through said opening about an axis perpendicular to the axis of movement of the blade first named.

6. In a device of the class described, a main frame, a tail portion extending rearwardly and laterally therefrom and provided with an opening therethrough adjacent to the end of the frame, a blade pivotally mounted at the end of the tail portion, and a blade mounted at the stern and movable through said opening about an axis perpendicular to the axis of movement of the blade first named, means connected with the frame for bracing the tail portion, and devices for independently controlling the blades.

7. In a device of the class described, a main frame, a tail portion extending rearwardly and laterally therefrom and provided with an opening therethrough adjacent to the end of the frame, a blade pivotally mounted at the end of the tail portion, and a blade mounted at the stern and movable through said opening about an axis perpendicular to the axis of movement of the blade first named, and means including a plurality of cables and cable winding devices, connected respectively with the blades, in reverse relation, for moving the respective blades in opposite directions.

8. In a device of the class described, an elevator comprising a blade, and means for mounting the blade for movement about a horizontal axis, a vertical rudder movable through the mounting means, arms extending perpendicularly of said axis and movable with the blade, cables connected with the blades and extending from the upper and lower surfaces thereof, and extending respectively to the outer ends of the arms, the cables connected with corresponding ends of the arms having connection with each other, a winding element to which the cables thus connected, extend, and about which they are wound in reverse relation, and retaining means for the cable winding element.

9. In a device of the class described, a main frame, including transverse units spaced apart, and gas cells mounted between said units, a main gas supply pipe, connections between the main pipe and the individual cells, relief valves, and means for operating the valves simultaneously, these means including devices movable longitudinally in opposite directions and elements connected with said devices and connected with the valves for rotating the latter in corresponding directions.

10. In a device of the class described, a main frame, including transverse units spaced apart, and gas cells mounted between said units, a main gas supply pipe, connections between the main pipe and the individual cells, relief valves, and means for operating the valves simultaneously, said means including arms for rotating the valves, the arms extending on opposite sides of the axes of rotation, cables connected with opposite ends of the arms, and means for tensioning one cable and simultaneously paying out the other cable.

In testimony whereof I affix my signature.
RALPH P. FOX.